United States Patent
Burghout et al.

(10) Patent No.: US 11,819,038 B2
(45) Date of Patent: Nov. 21, 2023

(54) SHAPED CHEESE PRODUCT

(71) Applicant: FrieslandCampina Nederland B.V., Amersfoort (NL)

(72) Inventors: Herman Frank Burghout, Wageningen (NL); Hein Van Den Borne, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 183 days.

(21) Appl. No.: 17/420,327

(22) PCT Filed: Jan. 17, 2020

(86) PCT No.: PCT/EP2020/051091
§ 371 (c)(1),
(2) Date: Jul. 1, 2021

(87) PCT Pub. No.: WO2020/148414
PCT Pub. Date: Jul. 23, 2020

(65) Prior Publication Data
US 2022/0079180 A1  Mar. 17, 2022

(30) Foreign Application Priority Data

Jan. 18, 2019  (EP) .................................. 19152572

(51) Int. Cl.
*A23C 19/097* (2006.01)
*A01J 25/12* (2006.01)
*A23C 19/068* (2006.01)

(52) U.S. Cl.
CPC ............ *A23C 19/0973* (2013.01); *A01J 25/12* (2013.01); *A23C 19/0688* (2013.01); *A23C 2250/10* (2013.01); *A23C 2250/15* (2013.01)

(58) Field of Classification Search
CPC ............ A23C 19/0973; A23C 19/0688; A23C 2250/10; A23C 2250/15
See application file for complete search history.

(56) References Cited

U.S. PATENT DOCUMENTS

| 4,627,984 A | 12/1986 | Authelet |
| 2007/0003665 A1* | 1/2007 | Kleinmann ........ A23C 19/0973 426/36 |
| 2007/0166448 A1* | 7/2007 | Holmes .................... A21C 9/04 426/582 |
| 2016/0100603 A1 | 4/2016 | Van Gurp |

FOREIGN PATENT DOCUMENTS

| EP | 1884166 | 2/2008 |
| EP | 2289344 | 3/2011 |
| EP | 2460414 | 6/2012 |
| GB | 707127 | 4/1954 |

OTHER PUBLICATIONS

Spanu "Inactivation of Listeria monocytogenes using Water Bath Heat Treatment in Vacuum Packed Ricotta Salata Cheese Wedges", J. Food. Sci. 2015, 80(7), pp. 1549-1556 (Year: 2015).*
Polis, Ricotta Salata Does Not Get Picked First in Gym Class But It Should, [Online], published Oct. 5, 2016, [retrieved on Feb. 28, 2023]. Retrieved from the Internet: <URL: https://www.bonappetit.com/test-kitchen/ingredients/article/ricotta-salata> (Year: 2016).*
International Search Report and Written Opinion, dated Mar. 23, 2020 International application No. PCT/EP2020/051091 (12 pgs.).

* cited by examiner

*Primary Examiner* — Changqing Li
(74) *Attorney, Agent, or Firm* — FITCH, EVEN, TABIN & FLANNERY, LLP

(57) ABSTRACT

The invention relates to a method for making a cheese product comprising: — subjecting ripened packed cheese to an anti-microbial treatment; — thereafter removing the packing material from the treated cheese; and — thereafter extruding the treated cheese to form a shaped cheese product or shredding the treated cheese to form a shredded cheese product. The cheese product accordingly obtained is also claimed.

10 Claims, No Drawings

SHAPED CHEESE PRODUCT

CROSS REFERENCE TO RELATED APPLICATIONS

This application is a U.S. national phase application of International Application No. PCT/EP2020/051091, filed Jan. 17, 2020, which claims benefit from European Patent Application No. 19152572.4, filed Jan. 18, 2019, which are each hereby incorporated herein by reference in their entirety.

FIELD OF THE INVENTION

The invention relates to a shaped cheese product and to a method for preparing a shaped cheese product.

BACKGROUND TO THE INVENTION

Cheese is a food product that is typically prepared from the milk of ungulates, in particular hoofed ungulates, such as cows, buffalo's, mares, camels, sheep or goats. Cheese can be prepared employing various methods, resulting in a wide range of cheese types that have different flavors, textures and shapes.

Although there are various methods for preparing cheese, generally the following steps in the cheese making process can be identified.

First, the milk is separated into liquid whey and solid curds. Commonly, such separation is achieved through acidification of the milk, by adding an acid, such as vinegar or by introducing bacteria to the mixture that are able to convert lactose into lactic acid. Typically, rennet (proteolytic enzymes which may be isolated from the stomach of ruminant animals, but for which also vegetable and microbial alternatives exist), is also added to enhance coagulation of casein proteins.

The solids are subsequently cut into smaller pieces, resulting in the removal of the majority of the whey liquids. Depending on the desired end-product, the solids can be cut into smaller pieces, thereby removing most of the liquid phase, giving a more solid (harder) end product, or they can be cut into larger pieces, retaining most of the moisture, after which a softer end-product is obtained.

The curds can then be pressed into a desired form, during which process more whey liquid can be removed, if desired. Pressing further promotes curd fusion, thereby forming a closed rind.

Optionally, the cheese can be treated with salt before ripening. Generally, the main component of the salt is sodium chloride. Salt enhances the flavor of cheese and additionally helps to preserve the cheese, since most microorganisms can not survive at high salt concentrations. Furthermore, salt can be used to dry the body of the cheese further through osmosis. This process can also change the texture of the cheese.

Salting can be achieved in various ways. For example, the cheese can be rubbed in with granular salt. Usually, the cheese is subjected to a brine bath (concentrated solution of sodium chloride in water) for several hours. It is also possible to add salt to the cheese in a later stage of the cheese making process, i.e. after ripening of the cheese.

Thereafter, the cheese is ripened. Optionally, the cheese is packed into a thin foil to preserve taste and protect the cheese from mold and dirt, during the ripening process. Longer ripening of the cheese results in "older" cheeses that typically have a more intense taste compared to cheeses produced with a shorter ripening time.

Cheese can be prepared from raw milk, or from milk that has undergone an anti-microbial treatment, to eliminate microbes that are present in the cheese. A commonly employed method is pasteurization, a process in which the milk is typically heated to a temperature of at least about 72° C. for at least 15 seconds. This process efficiently kills most microbes, including pathogenic bacteria such as *Salmonella enterica* and *Escherichia coli*, yeasts and fungi.

After sufficient ripening of the cheese, the cheese is ready to be consumed. In particular cases, however, the cheese is further processed.

For example, the cheese may be processed to form shaped cheese products, i.e. cheese products that are formed into a particular (pre-defined) shape, for example a bar or a figurine, e.g., for consumption as a cheese snack. The shaping usually involves a shaping treatment that disrupts the original structure of the cheese at least to some extent, such as an extrusion process, to yield the desired shape. In another process, the cheese is shredded to give a shredded cheese product. It is important that these products have elongated shelf-lives. Therefore, shaped cheese and shredded cheese products can be subjected to a pasteurization step prior to shredding or shaping.

Heating of cheese, however, has several negative side-effects. For example heating leads to the coalescence of non globular fat as a result of the disintegration of the fat globule membranes. Furthermore, heating in combination with the relatively low pH of cheese induces aggregation of casein due to increased hydrophobic interactions between casein molecules and the precipitation of calcium and phosphate ions from the medium. These events lead to texture changes, which contribute to an undesired change of organoleptic properties and taste. Furthermore, heating can affect the color, i.e. lead to browning of the cheese due to a reaction between amino acids and sugars, also known as the Maillard reaction.

EP-A 289 344 proposes a process in which the cheese is comminuted twice, followed by shaping the product by means of shredding and extrusion, to obtain a shaped cheese product to reduce negative structural changes of the cheese due to separation of the fat and casein.

However, such a method has the disadvantage that the double comminution of the product leads to degradation of the texture and hence a decrease in organoleptic properties.

Furthermore, EP-A 289 344 does not mention an antimicrobial treatment or provide any data on the shelf-life. It is expectable that the shelf-life of the obtained product is relatively poor.

It is an object of the present invention to provide an alternative method, which allows the preparation of a shaped cheese product, which is less prone to an undesired change in texture or organoleptic properties.

SUMMARY OF THE INVENTION

The inventors surprisingly found that with a method according to the invention a shaped cheese product is obtained with good organoleptic properties, such as a good taste, bite or mouthfeel and good microbial stability during cooled storage.

The invention, accordingly, relates to a method for making a cheese product, wherein ripened packed cheese is subjected to an anti-microbial treatment, the thus treated cheese is unpacked and extruded to form a shaped cheese product or shredded to form a shredded cheese product.

DETAILED DESCRIPTION OF THE INVENTION

More specifically, the invention relates to a method for making a cheese product, comprising:
- subjecting ripened packed cheese, preferably a foil-ripened cheese, to an anti-microbial treatment;
- thereafter removing the packing material from the treated cheese; and
- thereafter extruding the treated cheese to form a shaped cheese product or shredding the treated cheese to form a shredded cheese product.

The method is particularly suitable for preparing a shaped or shredded cheese product. Accordingly, the invention further relates to a shaped or shredded cheese product, preferably a foil-ripened cheese, obtainable by a method according to the invention which has a count of non-starter lactobacilli of about 10 cfu/g or less, colony-forming yeast cells of about 10 cfu/g or less and a count of molds of about to 10 cfu/g or less immediately after production, preferably after about 4 weeks after production and more preferably after about 10 weeks after production.

An advantage of this shaped cheese product is that it has a prolonged shelf-life because of the low count of the aforesaid micro-organisms. As indicated, the shaped or shredded cheese product in accordance with the invention has a count of non-starter lactobacilli of 1-10 cfu/g, colony-forming yeast cells of 1-10 cfu/g and a count of molds of 1-10 cfu/g, immediately after production, preferably after about 4 weeks, more preferably after about 10 weeks, in particular after 14 weeks.

As the skilled person knows, non-starter lactobacilli are mesophilic bacteria, which are able to grow at low pH and are able to grow both in presence and absence of lactose.

In addition a shaped cheese product according to the invention shows good organoleptic and textural properties, for 4 weeks or more, in particular for 10 weeks or more, more in particular for 14 weeks or more. E.g. in Example 1 it is shown that little texture change was observed over this period of time and only minor changes were observed after 14 weeks regarding the taste.

In a further preferred embodiment of the invention the anti-microbial treatment to which the shaped or shredded cheese product of the invention has been subjected is an anti-microbial heat treatment of the surface of the cheese, whilst at least the core of the cheese remains at a relatively low temperature, in particular below the temperature at which a substantial part of the fat in the cheese melts.

The term "or" as used herein means "and/or" unless specified otherwise.

The term "a" or "an" as used herein means "at least one" unless specified otherwise.

The term "about" in relation to a value generally includes a range around that value as will be understood by the skilled person. In particular, the range is from at least 10% below to at least 10% above the value, more specifically from 5% below to 5% above the value.

When referring to a "noun" (e.g. a compound, an additive etc.) in singular, the plural is meant to be included, unless specified otherwise.

For the purpose of clarity and a concise description features are described herein as part of the same or separate embodiments, however, it will be appreciated that the scope of the invention may include embodiments having combinations of all or some of the features described.

It was found that with the method according to the invention it is sufficient to subject only an outer region (the surface of the cheese and a part of the cheese below the surface, adjacent to the surface) of the cheese to an anti-microbial treatment, whilst keeping the core of the cheese untreated. It was surprisingly found that such a treatment results in an end product with good microbial properties, whilst the texture of a shaped cheese product prepared from it has an improved organoleptic property. It was hypothesized that this outcome might be due to the vast majority of the undesired microbes being located on the surface of the cheese. Undesired microbes are microbes which negatively affect one or more properties of the cheese, such as the taste, texture or appearance. Also undesired are pathogenic bacteria. Hence, the mere anti-microbial treatment of the surface of the cheese, and generally a part of the cheese close to the surface is sufficient for obtaining a cheese that can be used for the preparation of a shaped cheese product with good microbial properties and thus a good shelf-life.

In the method according to the invention ripened cheese that is packed into a suitable material is subjected to an anti-microbial treatment. A suitable packing material may be any material that is resistant to the treatment conditions and is air and moisture tight.

It is important that the packing material is resistant to the treatment conditions. For example, in case the anti-microbial treatment is based on heating of the cheese, the packing material should be resistant to heat, i.e. it should not melt, change shape or contaminate the cheese. Moreover, the material should be able to transfer the heat to the cheese, in order to achieve an elevated temperature inside of the package. Thus the material should not be too thermally insulating. Preferably the material has a heat transfer coefficient of between 0.15 and 0.4 $W/(m^2.K)$, more preferably between 0.15 and 0.35 $W/(m^2.K)$.

Furthermore, the material should preferably be air and moisture tight. Preferably the material has a permeability towards oxygen of between 50 and 250 $cm^3/m^3$ and permeability towards $CO_2$ of between 50 and 1000 $cm^3/m^3$ at a temperature of 23° C., 1 bar and 0% relative humidity.

Examples of materials that are suitable for packing the cheese include plastic cheese foil, such as laminates of ethylene vinyl alcohol, polyethylene and polyamide or polyphthalamide and ortho-phthalaldehyde, metal foil, such as aluminum foil and metal casing.

Preferably, the packing material is a foil.

The anti-microbial treatment can be any sort of treatment that results in the inactivation, preferably killing, of microorganisms, such as undesired bacteria, fungi, yeasts and the like, and that is compatible with the use of packed cheese. In a preferred embodiment the anti-microbial treatment is performed by heating the ripened packed cheese with a heating medium, such as with steam, with hot air or in a water bath. Particularly good results were obtained by heating with a water bath.

It is surprising that subjecting the cheese to an anti-microbial treatment involving steam, hot air or a water bath is suitable for the current invention, because in GB 707 127 it is taught that the heating of cheese with any other means than dielectric heating undoubtedly leads to a structural change due to the separation of casein and fat.

If the temperature is too high it is difficult to prevent texture degradation of the core of the cheese. However, if the temperature is too low, then the killing of microbes is not sufficient. Thus heating of the cheese usually takes place between about 60° C. and about 100° C., preferably at a temperature in the range of 70-95° C., more preferably at a temperature in the range of 72-95° C., in particular at about 90° C. Preferably, the heat treatment is pasteurization treatment. During pasteurization, a temperature at the surface is reached of —typically—at least 72° C.

The duration of the anti-microbial treatment should be sufficiently long to realize the desired reduction in viable microbe counts and the heat has transferred sufficiently deep into the cheese to have removed most microbes. However, in order to maintain the core of the cheese at a low temperature, typically below the melting temperature of the milk fat, the duration should not be too long, such that the elevated temperature does not reach the core of the cheese.

In a preferred embodiment the cheese is kept in a heating medium having a temperature in the range of 60-100° C., more preferably between 70° C. and 100° C., even more preferably in the range of 72-95° C. for about 20 to about 60 minutes, preferably for about 30 to about 50 min, more preferably for about 40 minutes. This has been found particularly effective, for various shapes and volumes of cheese, e.g. for treating a cheese having dimensions in the range of about 30×50×10 cm (in particular for cheese blocks) or a diameter of about 35 cm and a height of about 11 cm (in particular for round-cylindrical cheese, such as cheese wheels). It is generally preferred that the cheese (used) in accordance with the invention has such a relatively large size, as it has a favorably low area to volume ratio. This is favorable because it allows an effective anti-microbial treatment at and near the surface, whilst a substantial part of the cheese does not need to be subjected to anti-microbial treatment conditions, in particular conditions that affect the texture, such as a heat treatment above the melting temperature of the fat in the cheese.

Optimal temperature and duration can be determined by the skilled person based on common general knowledge and the information disclosed herein, dependent on the desired degree of reduction of viable micro-organisms, temperature of the heating medium, desired maximum core temperature (which can be measured in a sample cheese with a temperature probe), the size of the cheese.

In a preferred embodiment the surface of the cheese and a part of the cheese below the surface is subjected to an anti-microbial treatment, wherein the core temperature of the cheese remains below about the melting temperature of the fat in the cheese, typically 40° C. or less, preferably between 15° C. and 40° C. during the anti-microbial treatment; more preferably the core temperature remains below 35° C., in particular below 30° C.

The outer region of the cheese, i.e. the part of the cheese that is anti-microbially treated, in particular to a temperature of at least 60° C., preferably of at least 63° C., more preferably of at least 70° C., in particular of at least 72° C., generally forms 5-70% of the volume of the cheese, preferably 20-65% of the volume of the cheese, more preferably 30-65% of the volume of the cheese, most preferably 40-60%.

The core, i.e. typically the part wherein the temperature is maintained below 40° C., preferably below 35° C. in particular below 30° C., generally forms 20-90% of the volume of the cheese, preferably 30-75% of the volume of the cheese, more preferably 30-50%. The total of core and outer region may add up to a maximum of 100 vol %. However, in particular when the cheese is subjected to an anti-microbial heat treatment, there is generally an intermediate region wherein the temperature increases to a higher temperature than the core temperature, at some point during the treatment, but remains below the maximum temperature reached in the outer region.

After an anti-microbial heat treatment, the packed and treated cheese is generally cooled. During the heat treatment, the temperature increase will typically make the outer region of the cheese softer, or even partially melt. Cooling allows the heat-treated part of the cheese to regain firmness respectively solidify, such that it can be unpacked and handled well. The cheese is generally cooled down to a temperature below 30° C. Suitably after cooling the cheese has a temperature below 10° C., preferably in the range of about −5° C. to about 5° C., more preferably between −3 and 5° C., in particular about −2° C.

After the anti-microbial treatment, and in case of a heat treatment after cooling—the packaging, in particular the foil, is removed. Removal of the packaging typically is done at a temperature of 30° C. or less. The obtained treated cheese is then further processed. The cheese is preferably fed to an extruder. The extrusion process usually comprises several steps, which are based on known technology. Usually, the cheese is offered to the extruder in pieces, e.g. of approximately 1 kg. Thus, if necessary the cheese is cut into smaller pieces before subjecting them into the extrusion process. In an advantageous embodiment, the pieces are loaded into a funnel that supplies the cheese into a double screw system under vacuum conditions. Here the cheese is comminuted into smaller pieces that subsequently enter a shredding device where the cheese pieces are transformed into a cheese mass. The cheese mass then enters a shaping device where the cheese is formed into a particular shape, for example a bar.

The shaping or shredding is usually initiated at a temperature of 30° C. or less. Particularly good results have been obtained when the anti-microbially treated cheese, in particular a heat-treated cheese, is fed to an extruder at a temperature in the range of about −5° C. to 5° C., preferably about −2° C. At such temperatures, a smoother surface of the shaped product has been obtained.

Alternatively, the cheese mass can enter a shredding device, to shred the mass into pieces to form a shredded cheese product. Such cheese can be used during cooking, for example on pizza or pasta or added as a topping to a food product.

As indicated above, the invention further relates to a shaped or shredded cheese product obtainable by the method described above which cheese product has a count of non-starter lactobacilli of about 10 cfu/g or less, colony-forming yeast cells of about 10 cfu/g or less and a count of molds of about to 10 cfu/g or less immediately after production, preferably after about 4 weeks, more preferably after about 10 weeks, in particular after 14 or even after 18 weeks.

It is a major advantage of this anti-microbially treated cheese product that it has good microbial properties over time. Thus, the cheese product in accordance with the invention has a count of non-starter lactobacilli of 1-10 cfu/g, colony-forming yeast cells of 1-10 cfu/g and/or a count of molds of 1-10 cfu/g, immediately after production, preferably after about 4 weeks, more preferably after about 10 weeks, in particular after 14 or even after 18 weeks.

Preferably the cheese product according to the invention or used in a method according to the invention is prepared from a foil-ripened cheese.

Examples of cheese types that undergo such a treatment are hard or semi-hard cheeses, in particular from the Gouda-type, Edam-type, Maasdam-type, goat cheese or variations of these cheeses such as cheese with added seasoning. Various seasonings for cheese are generally known in the art. The seasoning can in particular be selected from the group of cumin, mustard seeds, oregano, basil, thyme, rosemary, sage, coriander and garlic, including blends of two or more of these, e.g. 'Italian seasoning'.

The cheese product according to the invention, accordingly, typically is a hard cheese or semi-hard cheese. A cheese is considered hard and semi-hard if the moisture content is less than 63 wt. % based upon the cheese without the fat. The cheese generally contains fat. The content of fat, in particular milk fat, is usually in the range of about 20 to about 30 wt. %, based on the total weight of the cheese. For example a Gouda cheese has a fat content of about 30 wt. % (total weight), which corresponds to about 50 wt. % based upon the dry matter (48+ cheese) Preferably, the cheese is a Dutch-type cheese. A Dutch-type cheese is in particular defined here as a cheese made of fresh cows' milk, the milk being at most partly skimmed. The cheese usually has a semi-hard to hard consistency and a smooth texture, usually with small holes; the flavor intensity varies widely.

Preferably the Dutch cheese is as defined by Walstra et al. in chapter 2 of "Cheese: Chemistry, Physics and Microbiology, Volume 2, Major cheese Groups, ed. P.F. Fox, Chapman & Hall, ISBN 0 412 53510 6 (V.2)".

Preferably, the Dutch-type cheese is a cheese from the Gouda-type, Edam-type or Maasdam-type.

Next, the invention will be illustrated by a number of examples.

EXAMPLES

Example 1 Steam Treatment of Edam and Gouda Cheese

An Edam or Gouda cheese block with dimensions 50×30×10 cm packed in a foil (bottom foil, i.e. the foil covering the bottom and side parts of the cheese, Styria form bar 230 GS14 blue of Mondi Styria spec 221821; upper foil, i.e. the foil covering the upper side of the cheese, Styria therm bar 110 blue Mondi Styria spec 221822), was equipped with two Datapaq heat probes located at 0.5 cm under the surface and one heat probe located at 1 cm under the surface. The cheese block was put on a conveyor belt and passed through an industrial oven suitable for steam cooking (FlowCook GEA). The cheese was heat treated for 40 minutes at 90° C. with a fan speed of 350 $min^{-1}$.

After the heat treatment the cheese block was cooled to below −2° C., the foil was removed and the blocks were fed into the extruder and extruded at about −2° C. into cylinders using an extruder ex VEMAG Maschinenbau GmbH.

The count of non-starter lactobacilli (NEN 6815) and yeast cells and molds (both via method ISO 6611) in the cylinders was measured after 1, 5, 10 and 18 weeks after the extrusion (i.e. after its production) and compared to a control cheese (see Table 1).

TABLE 1

| Cheese preparation (1) | | | | | |
|---|---|---|---|---|---|
| Cheese type | Treatment | Weeks after production | Non-starter Lactobacilli (cfu/g) | Yeast (cfu/g) | Mold (cfu/g) |
| Edam low salt | None | 1 | 65 | <10 | <10 |
| Edam low salt | None | 5 | >3 $10^5$ | <10 | <10 |
| Edam low salt | None | 10 | >3 $10^5$ | <10 | <10 |
| Edam low salt | None | 18 | >3 $10^5$ | <10 | <10 |
| Edam low salt | 40 min steam | 1 | <10 | <10 | <10 |
| Edam low salt | 40 min steam | 5 | <10 | <10 | <10 |
| Edam low salt | 40 min steam | 10 | <10 | <10 | <10 |
| Edam low salt | 40 min steam | 18 | <10 | <10 | <10 |
| Gouda young | None | 1 | 1,3 $10^4$ | <10 | <10 |
| Gouda young | None | 5 | >3 $10^5$ | <10 | <10 |
| Gouda young | None | 10 | >3 $10^5$ | <10 | <10 |
| Gouda young | None | 18 | >3 $10^5$ | <10 | <10 |
| Gouda young | 40 min steam | 1 | <10 | <10 | <10 |
| Gouda young | 40 min steam | 5 | <10 | <10 | <10 |
| Gouda young | 40 min steam | 10 | <10 | <10 | <10 |
| Gouda young | 40 min steam | 18 | <10 | <10 | <10 |

The >/<signs mark that the measured value is outside the dynamic range under the test conditions used. Depending on the degree of dilution that was used the lower and upper limit can vary. Thus, the shown data do not distinguish between, e.g., the non-starter lactobacilli counts of the untreated Edam or Gouda cheese after 5, 10 and 18 weeks, because the upper limit was reached.

However, the data clearly show that after a steam treatment of 40 min the non-starter lactobacilli were effectively eliminated from the cheese (i.e. <10 cfu/g). The non-starter lactobacilli and the colony-forming yeast counts were evaluated after 1, 5, 10 and 18 weeks from production and compared to cheese from the same type that was not steam treated. It was observed that the microbial properties remained excellent, i.e. showing <10 cfu/g of non-starter lactobacilli, <10 cfu/g yeast, <10 cfu/g molds after 18 weeks, for the cheeses that were subjected to 40 minutes of steam treatment, whereas for not treated cheese a significantly higher count of non-starter lactobacilli was observed after 1, 5, 10 and 18 weeks from production.

In addition the temperature was monitored at 0.5 cm and 1 cm below the surface. It was found that at a depth of 1 cm a temperature was reached of about 65-70° C. after about 35 mins. At a depth of 0.5 cm, temperatures about 75-80° C. are achieved after 37 mins.

Furthermore, the cheese was evaluated on taste and texture after 4, 8 and 14 weeks.

The texture of the cheese was satisfactory. The treated cheese was a bit shorter in texture and less sticky compared to extruded cylinders from untreated cheese. The cheese had a smooth surface and no crust particles.

The taste was satisfactory after 4, 8 and 14 weeks of production. No difference was tasted between cheese samples that were treated for 40 minutes.

Example 2 Steam Treatment of Gouda and Edam Cheese

Example 1 was repeated, this time with different cheese blocks of the Edam—, Gouda young— and Gouda matured-type. These blocks were extruded into cylinders in the same way as described in Example 1. The counts of non starter lactobacilli, yeast cells and molds of the extruded cheese products were evaluated after 0 and 10 weeks after extrusion (i.e. production).

The results are indicated in Table 2.

TABLE 2

Cheese preparation (2)

| Cheese type | Treatment | Weeks after production | Non-starter Lactobacilli (cfu/g) | Yeast (cfu/g) | Mold (cfu/g) |
|---|---|---|---|---|---|
| Edam | None | 0 | <10 | 8000 | <10 |
| Edam | None | 10 | 5000 | >150000 | <10 |
| Edam | 40 min steam | 0 | <10 | <10 | <10 |
| Edam | 40 min steam | 10 | <10 | <10 | <10 |
| Gouda young | None | 0 | <10 | >1000 | <10 |
| Gouda young | None | 10 | $15 \cdot 10^6$ | >150000 | <10 |
| Gouda young | 40 min steam | 0 | <10 | <10 | <10 |
| Gouda young | 40 min steam | 10 | <10 | <10 | <10 |
| Gouda matured | None | 0 | 11000 | 36000 | <10 |
| Gouda matured | None | 10 | 64000 | >150000 | <10 |
| Gouda matured | 40 min steam | 0 | <10 | <10 | <10 |
| Gouda matured | 40 min steam | 10 | <10 | <10 | <10 |

It was found that after a steam treatment of 40 minutes the yeast cells and non-starter lactobacilli were effectively eliminated from the cheese. The non-starter lactobacilli and the colony-forming yeast counts were evaluated after 10 weeks from production and compared to cheese from the same type that was not steam treated. It was observed that the microbial properties remained excellent, i.e. showing <10 cfu/g of non-starter lactobacilli, <10 cfu/g yeast, <10 cfu/g molds after 10 weeks, for the cheeses that were subjected to 40 minutes of steam treatment, whereas for non-treated cheese an increased count of non-starter lactobacilli and colony-forming yeast cells was observed after 10 weeks from production.

The invention claimed is:

1. A method of making a cheese product, the method comprising:
   subjecting a foil-ripened packed cheese of a hard type or a semi-hard type to an anti-microbial treatment performed by heating the ripened packed cheese in a heating medium having a temperature in the range of 60° C.-100° C.;
   thereafter removing the packing material from the treated cheese; and
   thereafter extruding the treated cheese to form a shaped cheese product or shredding the treated cheese to form a shredded cheese product.

2. The method of claim 1, wherein the cheese has been subjected to salting prior to the anti-microbial treatment.

3. The method of claim 1, wherein the cheese is of the Gouda-type, Edammer-type or Maasdam-type.

4. The method of claim 1, wherein the surface of the cheese is treated anti-microbially and wherein the core temperature of the cheese remains below 30° C. during the anti-microbial treatment.

5. The method of claim 1, wherein the heating in the heating medium involves heating with steam, heating with hot air or heating in a water bath.

6. The method of claim 1, wherein the anti-microbial treatment is a pasteurization.

7. The method of claim 1, wherein the heating medium has a temperature i in the range of 72° C. to 95° C.

8. The method of claim 7, wherein the temperature is maintained between 60° C. and 100° C. for about 20 to about 60 minutes.

9. The method of claim 1, wherein the treated, ripened packed cheese is cooled to a temperature in the range of about −5° C. to about 5° C.

10. The method of claim 1, wherein the treated, ripened cheese is fed to an extruder at a temperature in the range of about −5° C. to about 5° C.

* * * * *